United States Patent [19]

Katagiri

[11] Patent Number: 4,805,746
[45] Date of Patent: Feb. 21, 1989

[54] DISC BRAKE WITH SQUEAL PREVENTIVE MEANS

[75] Inventor: Masayoshi Katagiri, Toyota, Japan

[73] Assignee: Toyota Jidosha Kabushiki Kaisha, Aichi, Japan

[21] Appl. No.: 109,448

[22] Filed: Oct. 19, 1987

[30] Foreign Application Priority Data

Nov. 17, 1986 [JP] Japan .................. 61-273111

[51] Int. Cl.$^4$ .......................... F16D 55/224
[52] U.S. Cl. ................. 188/73.37; 188/73.45; 188/250 B
[58] Field of Search ................. 188/73.1, 73.35, 73.36, 188/73.37, 73.39, 73.44, 73.45, 250 E, 250 B

[56] References Cited

FOREIGN PATENT DOCUMENTS 0144556 11/1979 Japan ........................ 188/73.45
2033989 5/1980 United Kingdom .......... 188/73.45

OTHER PUBLICATIONS

Instruction Manual for Toyota Soarer (published in Jan., 1986) pp. 4-87 and 4-88.

Primary Examiner—Duane A. Reger
Attorney, Agent, or Firm—Parkhurst, Oliff & Berridge

[57] ABSTRACT

An anti-squeal disc brake, having a disc rotor rotating with a wheel of a vehicle, a pair of friction pads each including a friction member and a backing plate secured to the friction member, an actuator device for forcing the pair of friction pads against opposite friction surfaces of the disc rotor, and a torque member which is secured to a fixed member of the vehicle and which supports the friction pads movably toward and away from the opposite friction surfaces of the rotor, the torque member receiving, through the backing plates, tangential forces which act on the friction pads during frictional contacts of the friction members with the friction surfaces of the rotor. The backing plate of each of at least one of the friction pads is formed with a force-transmitting portion which transmits to the torque member the tangential force acting on the corresponding friction pad, at a position lying in a plane which includes the corresponding one of the opposite friction surfaces of the rotor, or at a position spaced apart from the above-indicated plane in a direction toward the other friction surface of the rotor.

14 Claims, 5 Drawing Sheets

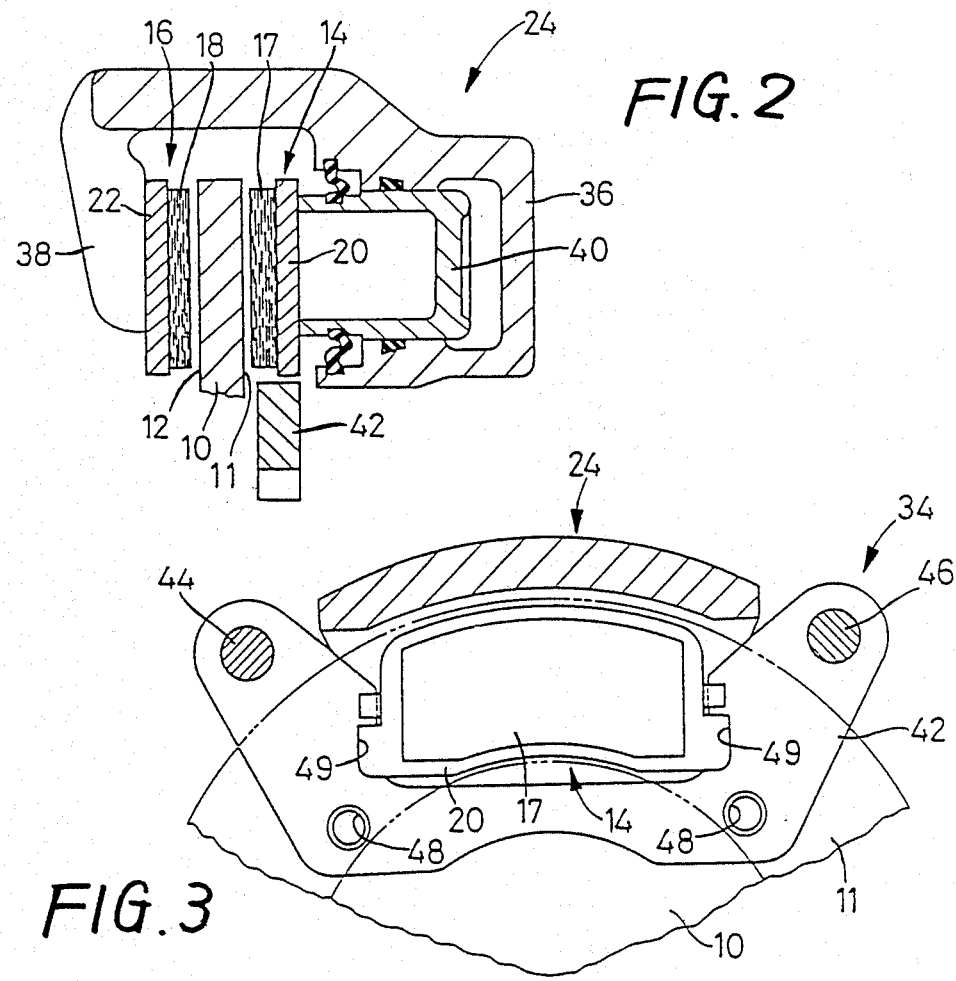
FIG. 2
FIG. 3
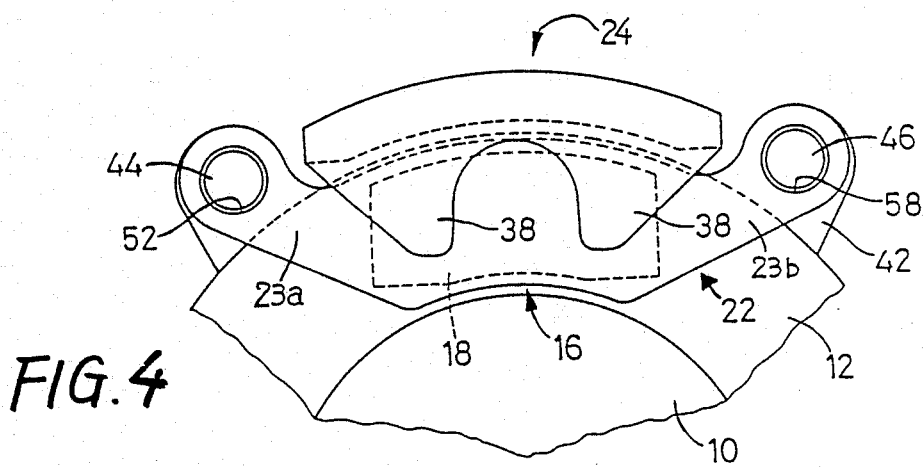
FIG. 4

DISC BRAKE WITH SQUEAL PREVENTIVE MEANS

BACKGROUND OF THE INVENTION

1. Field of the Invention

The present invention relates in general to an antisqueal disc brake, and more particularly to improvements associated with transmission of tangential forces from friction pads to a torque member.

2. Discussion of the Prior Art

As described in Instruction Manual for Toyota Soarer (published in January, 1986), pages 4-87 and 4-88, a disc brake generally includes a disc rotor rotating with a wheel of a vehicle, a pair of friction pads each having a friction member and a backing plate secured to a back surface of the friction member, an actuator device for forcing the pair of friction pads against opposite friction surfaces of the disc rotor, for frictional contacts of the friction members with the friction surfaces of the rotor, and a torque member which is secured to a fixed member of the vehicle and which supports the pair of friction pads movably toward and away from the friction surfaces of the disc rotor, so that the torque member receives, through the backing plates, tangential forces which act on the friction pads during brake application.

Such a disc brake may under some conditions generate creaking or squealing noises during brake applications. This squealing phenomenon is considered to be caused by certain unstable vibrations due to an interaction between the disc rotor and the friction pads.

As indicated in FIG. 11 by way of example, when a friction pad 212 (only this outer pad being shown in the figure) is forced by an actuator device (not shown) against a rotating disc rotor 210, a tangential force F acts on the friction pad 212 in a direction parallel to a friction surface 214 of the disc rotor 210, by reaction of a friction force applied by the friction pad 212 to the disc rotor 210. This tangential force F is transmitted to a torque member 220, through a backing plate 218 secured to the back surface of a friction member 216 of the pad 212. Since a working point A at which the torque member 220 receives the transmitted tangential force F is spaced apart from the friction surface 214 by at least a distance equal to a thickness of the friction member 216, there arises a moment M in a clockwise direction (in FIG. 11) about the working point A. Consequently, the friction pad 212 is slightly displaced as exaggeratedly indicated in two-dot chain line in FIG. 11, in a direction that causes the surface pressure of the disc rotor 210 to rise on the leading side. Stated differently, the friction pad 212 tends to be forced against the friction surface 214 with a larger force on the leading side than on the trailing side. It is surmised that this phenomenon may cause unstable vibrations of the friction pad 212, which in turn may cause vibrations of the disc rotor 210, giving rise to operating conditions of the disc brake in which creaking or squealing noises are easily produced.

While the tangential force F is received by a wall surface of a cutout or slot formed in the torque member 220 to accommodate the friction pad 212 in the example of FIG. 11, it is presumed that a similar phenomenon takes place in the case where the tangential force is received by a pin 222 secured to a torque member, at a point B on the leading side of the rotor 210, as indicated in FIG. 12.

SUMMARY OF THE INVENTION

It is accordingly an object of the present invention to provide a disc brake which overcomes or ameliorates the prior art problem indicated above, i.e., which has means for effective minimization of squealing noises.

The above object may be attained according to the principle of the present invention, which provides a disc brake for a vehicle, having a disc rotor rotating with a wheel of the vehicle, a pair of friction pads each including a friction member and a backing plate secured to a back surface of the friction member, an actuator device for forcing the pair of friction pads against opposite friction surfaces of the disc rotor, for frictional contacts of the friction members with the opposite friction surfaces, and a torque member which is secured to a fixed member of the vehicle and which supports the pair of friction pads movably toward and away from the opposite friction surfaces of the disc rotor, the torque member receiving, through the backing plates, tangential forces which act on the friction pads during the frictional contacts of the friction members with the friction surfaces of the disc rotor, wherein the backing plate of each of at least one of the pair of friction pads includes a force-transmitting portion which transmits to the torque member the tangential force acting on the corresponding friction pad, at a position lying in a plane which includes the corresponding one of the opposite friction surfaces of the disc rotor, or at a position spaced apart from the above-indicated plane in a direction toward the other friction surface of the disc rotor.

The disc brake of the present invention constructed as described above is operable with reduced squealing noises. Namely, where a point of contact (working point) between the force-transmitting portion formed on the backing plate and the torque member is located on the plane which includes the corresponding friction surface of the rotor, a tangential force acting on the corresponding friction pad during brake application will not cause the friction pad to be subjected to a moment that acts to increase its surface pressure on its leading side, as encountered in the known disc brake arrangement. Where the working point or contact point is located at a position spaced apart from the above-indicated plane in the direction toward the other friction pad, there arises a moment acting in the direction opposite to that of the moment generated in the known disc brake. That is, there arises a moment acting in a direction that causes the surface pressure of the rotor to be higher on the trailing side. In either of these two cases, an otherwise occurring tendency of the friction pad to press the leading side of the rotor with a larger force may be avoided. This is considered to be conducive to minimization of creaking or squealing noises generated by the disc brake.

According to one feature of the invention, the force-transmitting portion is disposed at a leading or trailing end portion of the at least one of the friction pads.

According to an alternative feature of the invention, the force-transmitting portion is disposed at both leading and trailing ends of the at least one of the friction pads.

In accordance with a further feature of the invention, the force-transmitting portion transmits the tangential force to the torque member at the position spaced apart from the above-indicated plane toward the other friction surface of the disc rotor.

According to a yet further feature of the invention, the torque member comprises a generally planar bracket disposed on one of opposite sides of the disc rotor, and a pair of torque-receiving protrusions which extend from the bracket over an outer periphery of the disc rotor toward the other side of the disc rotor. In this case, one of the pair of friction pads is supported by the torque-receiving protrusions.

In one form of the above feature of the invention, the bracket has a cutout for accommodating the other of the pair of friction pads.

In another form of the above feature of the invention, the force-transmitting portion comprises a cylindrical portion which protrudes from a surface of the backing plate of the one friction pad which faces the disc rotor, in a direction parallel to an axis of rotation of the disc rotor, the cylindrical member having a radially inwardly extending flange at a distal open end thereof, the flange engaging one of the pair of torque-receiving protrusions.

In a further form of the same feature of the invention, the force-transmitting portion comprises a tongue-like extension which protrudes from a surface of the backing plate of the one friction pad which faces the disc rotor, toward the other friction pad. In this instance, the extension has a free end engaging one of the pair of torque-receiving protrusions.

In a still further form of the same feature of the invention, the force-transmitting portion comprises a tapered projection which protrudes from a surface of the backing plate of the one friction pad which faces the disc rotor, toward the other friction pad. In this arrangement, the tapered projection has a diameter which decreases from a proximal large end toward a distal small end, and the tapered projection engages one of the pair of torque-receiving protrusions at the distal small end.

In a yet further form of the same feature of the invention, the backing plate of the one friction pad has an extension which extends from one of lateral ends thereof. The extension consists of an inclined part which extends obliquely toward the other friction pad, and a distal end part which extends from the inclined part in a direction parallel to the plane. In this case, the distal end part has an engaging hole engaging one of the torque-receiving protrusions, and thereby functions as the force-transmitting portion.

In a still further form of the same feature of the invention, the backing plate of the one friction pad has an extension extending from one of lateral end portions thereof obliquely toward the other friction pad. The extension has an engaging hole engaging one of the torque-receiving protrusions, and thereby functions as the force-transmitting portion.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 2 is an elevational view in cross section taken along line II—II of FIG. 1;

FIG. 3 is an elevational view in cross section taken along line III—III of FIG. 1;

FIG. 4 is an elevational view taken in the direction of arrow IV in FIG. 1;

DETAILED DESCRIPTION OF THE PREFERRED EMBODIMENTS

Figure 1:
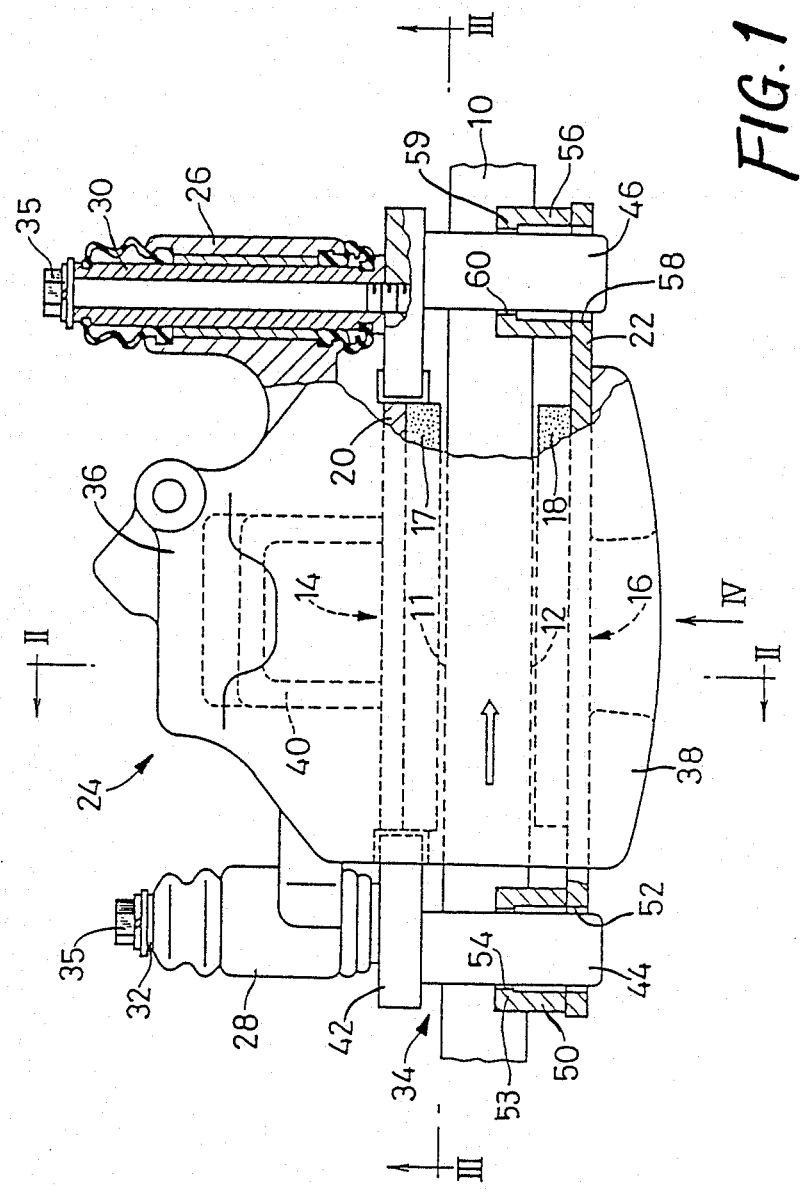
FIG. 1 is a partially cut-away plan view of one embodiment of an anti-squeal disc brake of the invention.

Referring first to FIGS. 1 and 2, reference numeral 10 designates a disc rotor (hereinafter referred to simply as "rotor") which has opposite friction surfaces 11, 12 and which is rotated with a wheel of an automotive vehicle. Facing the opposite friction surfaces 11, 12 of the rotor 10, there are disposed an inner friction pad 14 and an outer friction pad 16. Each of the inner and outer friction pads 14, 16 has a friction member 17, 18, and a backing plate 20, 22 secured to the back surface of the friction member 17, 18. A caliper 24 is disposed so as to extend over the friction pads 14, 16 and the outer periphery of the rotor 10.

The caliper 24 includes a pair of cylindrical portions 26, 28 at its opposite ends spaced apart from each other in a rotating direction of the rotor 10. The cylindrical portions 26, 28 slidably engage respective two guide pins 30, 32, so that the caliper 24 is supported movably in a direction parallel to an axis of rotation of the rotor 10. The guide pins 30, 32 are secured by bolts 35 to a torque member 34 which is secured to a stationary or fixed member (not shown) of the vehicle. The caliper 24 includes a cylinder portion 36 which faces the inner friction pad 14, and a jaw portion 38 which faces the outer friction pad 16. With a pressurized brake fluid applied to the cylinder portion 36, a piston 40 slidably received within the cylinder portion 36 is moved to force the inner friction pad 14 against the friction surface 11 of the rotor 10, while the jaw portion 38 forces the outer friction pad 16 against the other friction surface 12 of the rotor 10, by means of reaction of the movement of the piston 40.

As shown in FIG. 1, the torque member 34 includes a generally planar main bracket (hereinafter referred to as "bracket") 42 which faces the inner friction surface 11 of the rotor 10, and a pair of torque-receiving pins 44, 46 which extend from the bracket 42 over the outer periphery of the rotor 10, to the position of the outer friction pad 16. As indicated in FIG. 3, the bracket 42 has mounting holes 48 formed in its portions relatively near the axis of the rotor 10, and is secured to a steering knuckle (not shown) which serves as the fixed member. The torque-receiving pins 44, 46 are formed integrally with leading and trailing ends of the bracket 42, such that the pins 44, 46 project parallel to the axis of rotation of the rotor 10. The bracket 42 has a cutout or slot 49 in which the inner friction pad 14 is accommodated such that the pad 14 is movable parallel to the axis of the rotor 10.

On the other hand, the outer friction pad 16 is provided with arms 23a, 23b which extend from the backing plate 22 toward the torque-receiving pins 44, 46, as illustrated in FIG. 4. The arm 23a of the backing plate 22 disposed on the side of the torque-receiving pin 44 (on the leading side of the rotor 10) is provided with a force-transmitting portion in the form of an integrally formed cylindrical portion 50, as shown in FIG. 1. This cylindrical portion 50 serves to transmit to the torque-receiving pin 44 a tangential force which acts on the outer friction pad 16 during a frictional contact of the outer friction member 18 with the outer friction surface 12 of the rotor 10. For example, the cylindrical portion 50 is formed by securing a cylindrical member, at one of its open ends, to the inner surface of the backing plate 22, by means of friction welding or ring-projection welding, such that the welded cylindrical member or cylindrical portion 50 protrudes from the backing plate 22 in a direction parallel to the axis of the rotor 10. Thus, the cylindrical portion 50 constitutes a part of the backing plate 22. The backing plate 22 has a relief hole 52 which has the same diameter as a bore formed through the cylindrical portion 50. Further, the cylindrical portion 50 has a radially inward flange 53 at its distal open end, so that the inward flange 53 defines an engaging hole 54 concentric with the relief hole 52. The torque-receiving pin 44 extends through the cylindrical portion 50 and the relief hole 52, and engages the engaging hole 54 whose diameter is smaller than the inside diameter of the portion 50 but slightly larger than the outside diameter of the pin 44. The distance of protrusion of the cylindrical portion 50 from the backing plate 22 is greater than a thickness of the outer friction member 18. Therefore, the inward flange 53 of the cylindrical portion 50, i.e., the engaging hole 54 is located at a position which is inwardly spaced apart from a plane including the friction surface 12, toward the inner friction pad 14, by a distance equal to a difference between the protrusion distance (height) of the cylindrical portion 50 and the thickness of the friction member 18. At the thus located engaging hole 54, the force-transmitting portion or cylindrical portion 50 slidably engages the torque-receiving pin 44.

The other arm 23b of the backing plate 22, which corresponds to the other torque-receiving pin 46 (on the trailing side of the rotor 10), is provided with a similar force-transmitting portion in the form of a cylindrical portion 56, and a similar relief hole 58. The cylindrical portion 56 has a radially inward flange 59 defining an engaging hole 60 slidably engaging the torque-receiving pin 46.

In the arrangement described above, the outer friction pad 16 is supported by the torque-receiving pins 44, 46 such that the pad 16 is movable toward and away from the outer friction surface 12 of the rotor 10, in the direction parallel to the axis of the rotor 10, and such that the torque-receiving pins 44, 46 receive the tangential force which acts on the outer friction pad 16 during brake application, that is, during the frictional contact of the outer friction member 18 with the outer friction surface 12 of the rotor 10. In FIG. 1 and figures which will be referred to, clearances between the torque-receiving pins 44, 46 and the engaging holes 54, 56 are indicated exaggeratedly.

Figure 5:
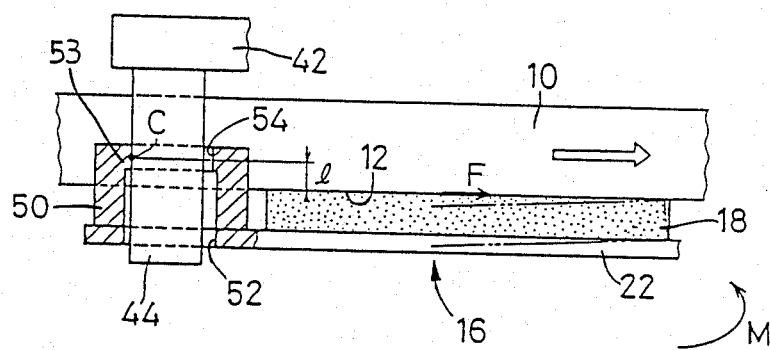
FIG. 5 is a view showing an outer friction pad in pressed contact with a rotor.

In the thus constructed disc brake, a tangential force F is exerted to the outer friction pad 16 while the two friction pads 14, 16 are forced against the friction surfaces 11, 12 by the caliper 24, as indicated in FIG. 5 which shows the leading side of the outer friction pad 16. This tangential force F is transferred from the friction member 18 to the force-transmitting portion 50 of the backing plate 22, and then transmitted to the torque-receiving pin 44, more precisely, to a point C at which the inner surface of the engaging hole 54 formed in the force-transmitting portion 50 contacts the torque-receiving pin 44. Since this contact or working point C is spaced away from the friction surface 12 of the rotor 10 by a distance l (l>0) toward the inner friction pad 14, the tangential force F acting on the outer friction pad 16 gives rise to a counterclockwise moment M (in FIG. 5) about the point C. Consequently, the outer friction pad 16 tends to be displaced by a small amount in a direction that causes the surface pressure of the friction surface 12 of the rotor 10 to increase on the trailing side, as exaggeratedly indicated in two-dot chain line in FIG. 5. Therefore, the instant arrangement eliminates an otherwise existing tendency of the outer friction pad 16 to apply a higher pressure to the leading side of the rotor 10 than its trailing side, thereby preventing unstable vibrations of the pad 16 and thus reducing a creaking or squealing brake noise.

While the illustrated embodiment is adapted such that the torque-receiving pin 44 on the leading side of the rotor 10 receives the tangential force F acting on the outer friction pad 16, it is possible that the other torque-receiving pin 46 on the trailing side of the rotor 10 receives the tangential force F. In this case, there arises a moment in the counterclockwise direction (in FIG. 1) about a working point of contact at which the force-transmitting portion or cylindrical portion 56 contacts the torque-receiving pin 46, whereby the surface pressure of the rotor 10 becomes higher on its trailing side than on its leading side. Thus, the force-transmitting portion 56 provides the same effect as obtained by the force-transmitting portion 50 on the leading side of the rotor 10.

Although the force-transmitting portion 50, 56 may be provided on only one of the leading and trailing sides of the rotor 10, it is advantageous to provide the outer friction pad 16 with the force-transmitting portions 50, 56 on both sides of the rotor, so that the outer friction pad 16 is constructed symmetrically so as to permit the disc brake to be used for either one of left and right wheels of the vehicle, for increased versatility of the disc brake. In this case, the radial clearances between the pins 44, 46 and the engaging holes 54, 60 may be determined so that one of the pins 44, 46 receives the tangential force from the corresponding one of the force-transmitting portions 50, 56, depending upon whether the disc brake is used for the left wheel or right wheel of the vehicle. However, the instant disc brake may be adapted such that both of the torque-receiving pins 44, 46 receive the tangential force F. In this case, the same radial clearances are provided for the two pins 44, 46.

In the case where a very high braking pressure is applied to the disc brake, there is a tendency that the friction member 18 is pushed against the friction surface by an accordingly large force, over the entire area of the friction surface 12. In this respect, it is considered that the present disc brake provides a particularly high effect to reduce the brake squeal, where the braking pressure is relatively low.

Figure 6:
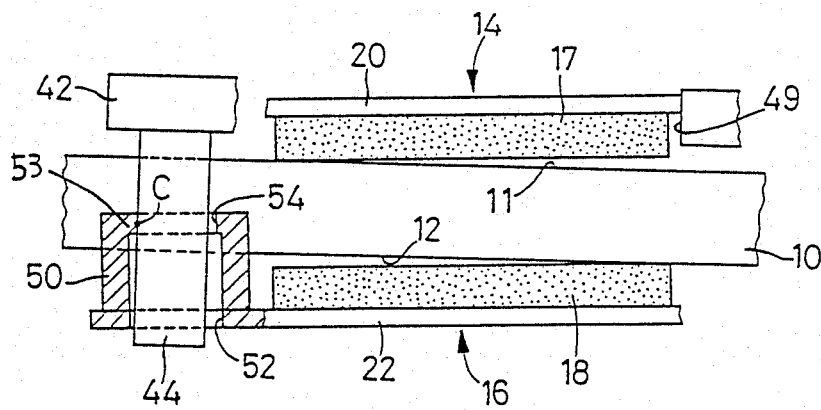
FIG. 6 is a view exaggeratedly illustrating displacements of inner and outer friction pads of FIG. 1 due to tangential forces transmitted from the rotor.

While the tangential force F acting on the outer friction pad 16 has been described above, the tangential force acting on the inner friction pad 14 is transferred through the backing plate 20 to an inner wall surface of the cutout 49 on the trailing side of the rotor 10, as in a conventional disc brake, as indicated in FIG. 6. Consequently, the inner friction pad 14 is subjected to a moment in the counterclockwise direction (in FIG. 6), whereby the inner friction pad 14 tends to be slightly displaced (as exaggeratedly illustrated in the figure), in a direction that causes the surface pressure of the rotor 10 to increase on the leading side. This displacement creates a condition in which the inner friction pad 14 undergoes unstable vibrations, which may cause vibrations of the rotor 10. However, the thus vibrated rotor 10 tends to be forced by the outer friction pad 16 during rotation thereof, due to the moment acting on the outer friction pad 16 so as to apply a higher surface pressure to the trailing side of the rotor 10. In other words, the trailing side of the outer friction pad 16 functions to restrict or damp the vibrations of the rotor 10 caused by the inner friction pad 14. Thus, it is surmised that the outer friction pad 16 also serves to prevent the brake squeal caused by the inner friction pad 14.

Referring next to FIG. 7 through FIG. 10, other embodiments of the present invention will be described. In the interest of brevity, the same reference numerals as used in the first embodiment will be used in these modified embodiments, to identify the corresponding components, and redundant description of these components will not be provided.

Figure 7:
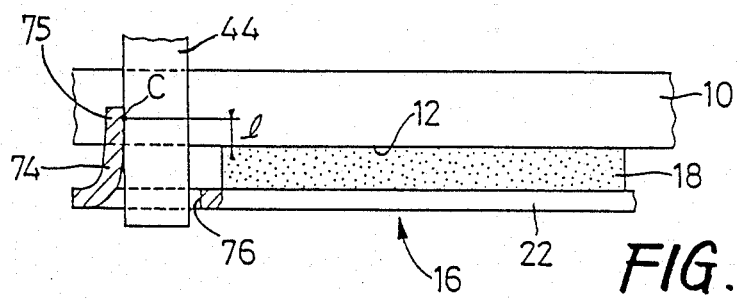
FIGS. 7, 8, 9 and 10 are views illustrating the outer friction pads used in other embodiments of the invention, respectively.

In the embodiment of FIG. 7, the lateral end portion of the backing plate 22 of the outer friction pad 16 on the leading side of the rotor 10 is provided with a force-transmitting portion in the form of a tongue-like extension 74, which is formed by cutting a U-shaped slit in the above lateral end portion of the backing plate 22, and folding or bending up the U-shaped cut part about the uncut base of the U-shape, such that the bent U-shaped cut part, i.e., the tongue-like extension 74 protrudes toward the inner friction pad 14. As a result of this bending operation, the backing plate 22 is provided with an engaging hole 76. Since the tongue-like extension 74 is formed with a slight angle of inclination toward the trailing side of the rotor 10, a free end 75 of the extension 74 has a contact or working point C whose distance l from the friction surface 12 toward the inner friction pad 14 is greater than zero (l>0).

Figure 8:
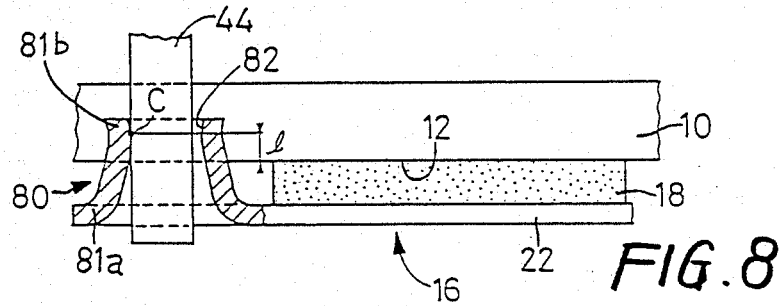

In the embodiment of FIG. 8, the backing plate 22 is provided with a force-transmitting portion in the form of a tapered projection 80 which protrudes toward the inner friction pad 14. This tapered projection 80 is formed by punching and drawing operations. The tapered projection 80 has a diameter which decreases from a proximal large end 81a toward a distal small end 81b, which defines an engaging hole 82 which engages the torque-receiving pin 44.

Figure 9:
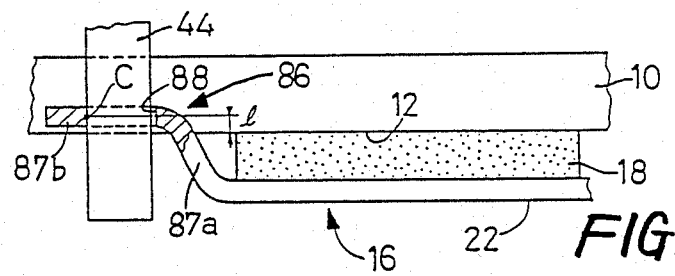

In the embodiment of FIG. 9, the backing plate 22 is provided with a force-transmitting portion in the form of an extension 86, which extends from one of the lateral ends of the backing plate 22. The extension 86 consists of a bent inclined part 87a which extends obliquely toward the inner friction pad 14, and a distal planar end part 87b which extends from the inclined part 87a in a direction parallel to the friction surface 12 of the rotor 10. The distal end part 87b is formed with an engaging hole 88 which engages the torque-receiving pin 44.

Figure 10:
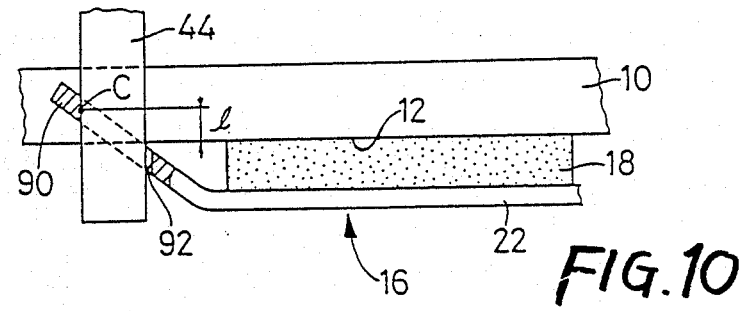
Figure 11:
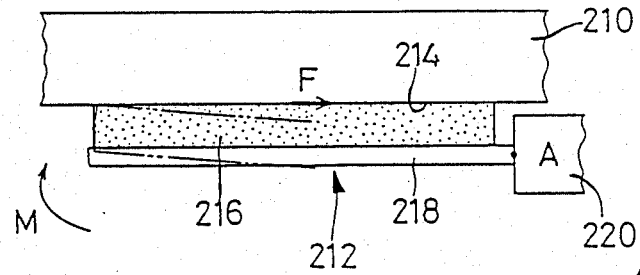
FIGS. 11 and 12 are views depicting outer friction pads in pressed contact with a rotor, in known disc brakes.
Figure 12:
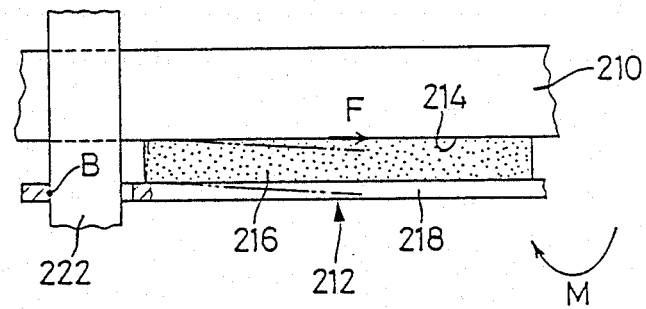

In the embodiment of FIG. 10, the backing plate 22 is provided with a force-transmitting portion in the form of a bent extension 90 which extends from one of its lateral end portions obliquely such that the extension 90 forms an acute angle with respect to a plane parallel to the friction surface 12 of the rotor 10. The extension 90 has an engaging hole 92 which engages the torque-receiving pin 44.

While the modified embodiments of FIGS. 7-10 have the force-transmitting portion only on the leading side of the outer friction pad 16, the same force-transmitting portion may be provided also on the trailing side of the pad 16, such that the two force-transmitting portions are symmetrical with each other. In this case, one or both of the torque-receiving pins 44, 46 is/are adapted to receive the tangential force from the corresponding force-transmitting portion or portions, by suitably determining the clearances between the force-transmitting portions and the pins. Alternatively, the force-transmitting portion may be provided on only one of the leading and trailing sides of the outer friction pad 16, while a conventional force-transmitting portion is provided on the other side.

In the embodiments which have been described, the point of transfer of the tangential force or the working point C is located at a point spaced apart from the friction surface 12 of the rotor 10 toward the inner friction pad 14, that is, the distance is greater than zero. However, it is possible that the working point is located on a plane which includes the friction surface 12 of the rotor 10, that is, the distance l is zero. Although this alternative arrangement does not permit the outer friction pad 16 to positively provide a moment in a direction that causes the surface pressure of the rotor 10 to increase on the trailing side, the arrangement is effective to avoid a higher surface pressure on the leading side of the rotor 10 than on the trailing side, which is considered one of factors for the generation of squealing noises of the brake. According to this arrangement wherein the distance l is zero where the pad 16 is new, the distance l becomes larger than zero and increases as the friction member 18 wears.

Further, in addition to the force-transmitting portion or portions provided on the outer friction pad 16, similar force-transmitting portion or portions may be provided on the inner friction pad 14 such that the distance l is equal to or greater than zero. Alternatively, only the inner friction pad 14 may be provided with a force-transmitting portion or portions.

It is to be understood that the present invention may be embodied with various other changes and modifications, which may occur to those skilled in the art.

What is claimed is:

1. A disc brake for a vehicle, having a disc rotor rotating with a wheel of the vehicle, a pair of friction pads each including a friction member and a backing plate secured to a back surface of the friction member, an actuator device for forcing said pair of friction pads against opposite friction surfaces of said disc rotor, for frictional contacts of said friction members with said opposite friction surfaces, and a torque member which is secured to a fixed member of the vehicle such that said torque member is immovable relative to said fixed member and which supports said pair of friction pads movably toward and away from said opposite friction surfaces of said disc rotor, said torque member receiving, through said backing plates, tangential forces which act on said friction pads in a circumferential direction of said disc rotor during said frictional contacts of said friction members with said friction surfaces of the disc rotor; wherein the improvement comprises:

said backing plate of each of at least one of said pair of friction pads including a force-transmitting portion which contacts said torque member in said circumferential direction to transmit thereto the tangential force acting on the corresponding friction pad, at a first position defined by a first plane including the corresponding one of said opposite friction surfaces of said disc rotor and contains a second plane including the other friction surface of the disc rotor, said first position containing said first plane, said backing plate having no portion thereof which contacts said torque member in said circumferential direction lying in a second position defined by said first plane.

2. A disc brake according to claim 1, wherein said torque member comprises a torque-receiving portion which extends over an outer periphery of said disc rotor from one of opposite sides of the disc rotor toward the other side of the rotor, said force-transmitting portion contacting said torque-receiving portion in said circumferential direction to transmit said tangential force thereto.

3. A disc brake according to claim 2, wherein said force-transmitting portion is disposed at a leading end portion of said at least one of said friction pads.

4. A disc brake according to claim 2, wherein said force-transmitting portion is disposed at a trailing end portion of said at least one of said friction pads.

5. A disc brake according to claim 2, wherein said force-transmitting portion is disposed at both leading and trailing ends of said at least one of said friction pads.

6. A disc brake according to claim 2, wherein said force-transmitting portion transmits said tangential force to said torque member at said position spaced apart from said plane toward said other friction surface of the disc rotor.

7. A disc brake according to claim 1, wherein said torque member comprises a generally planar bracket disposed on one of opposite sides of the disc rotor, and a pair of torque-receiving protrusions which extend from said bracket over an outer periphery of the disc rotor toward the other side of the disc rotor, one of said pair of friction pads being supported by said torque-receiving protrusions.

8. A disc brake according to claim 7, wherein said bracket has a cutout for accommodating the other of said pair of friction pads.

9. A disc brake according to claim 7, wherein said force-transmitting portion comprises a cylindrical portion which protrudes from a surface of the backing plate of said one friction pad which faces the disc rotor, in a direction parallel to an axis of rotation of the disc rotor, said cylindrical member having a radially inwardly extending flange at a distal open end thereof, said flange engaging one of said pair of torque-receiving protrusions.

10. A disc brake according to claim 7, wherein said force-transmitting portion comprises a tongue-like extension which protrudes from a surface of said backing plate of said one friction pad which faces the disc rotor, toward the other friction pad, said extension having a free end engaging one of said pair of torque-receiving protrusions.

11. A disc brake according to claim 7, wherein said force-transmitting portion comprises a tapered projection which protrudes from a surface of said backing plate of said one friction pad which faces the disc rotor, toward the other friction pad, said tapered projection having a diameter which decreases from a proximal large end toward a distal small end, said tapered projection engaging one of said pair of torque-receiving protrusions at said distal small end.

12. A disc brake according to claim 7, wherein said backing plate of said one friction pad has an extension which extends from one of lateral ends thereof, said extension consisting of an inclined part which extends obliquely toward said other friction pad, and a distal end part which extends from said inclined part in a direction parallel to said plane, said distal end part having an engaging hole engaging one of said torque-receiving protrusions, and thereby functioning as said force-transmitting portion.

13. A disc brake according to claim 7, wherein said backing plate of said one friction pad has an extension extending from one of lateral end portions thereof obliquely toward said other friction pad, said extension having an engaging hole engaging one of said torque-receiving protrusions, and thereby functioning as said force-transmitting portion.

14. A disc brake for a vehicle, having a disc rotor rotating with a wheel of the vehicle, a pair of friction pads each including a friction member and a backing plate secured to a back surface of the friction member, an actuator device for forcing said pair of friction pads against opposite friction surfaces of said disc rotor, for frictional contacts of said friction members with said opposite friction surfaces, and a torque member which is secured to a fixed member of the vehicle and which supports said pair of friction pads movably toward and away from said opposite friction surfaces of said disc rotor, said torque member receiving, through said backing plates, tangential forces which act on said friction pads during said friction contacts of said friction members with said friction surfaces of the disc rotor, wherein the improvement comprises:

said torque member comprising a generally planar bracket disposed on one of opposite sides of the disc rotor, and a pair of torque-receiving protrusions which extend from said bracket over an outer periphery of the disc rotor toward the other side of the disc rotor, said backing plate of each of at least one of said pair of friction pads being supported by said torque-receiving members and including a force-transmitting portion which contacts one of said torque-receiving protrusions in said circumferential direction to transmit to said torque member the tangential force acting on the corresponding friction pad, at a position spaced apart from a plane which includes the corresponding one of said opposite friction surfaces of said disc rotor in a direction toward the other friction surface of the disc rotor.

* * * * *